US012728798B2

(12) United States Patent
Treinen et al.

(10) Patent No.: US 12,728,798 B2
(45) Date of Patent: Sep. 8, 2026

(54) VEHICLE SEAT WITH ELECTRONIC DEVICE CHARGER

(71) Applicant: FCA US LLC, Auburn Hills, MI (US)

(72) Inventors: Benjamin T Treinen, Birmingham, MI (US); Everard J Scott, Sterling Heights, MI (US); Ryan C Nagode, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 173 days.

(21) Appl. No.: 18/544,538

(22) Filed: Dec. 19, 2023

(65) Prior Publication Data

US 2024/0217418 A1 Jul. 4, 2024

Related U.S. Application Data

(60) Provisional application No. 63/478,374, filed on Jan. 4, 2023.

(51) Int. Cl.

| | |
|---|---|
| ***B60R 7/04*** | (2006.01) |
| ***B60N 2/56*** | (2006.01) |
| ***B60N 3/10*** | (2006.01) |
| ***B60R 5/00*** | (2006.01) |

(52) U.S. Cl.

CPC ............ *B60R 5/006* (2013.01); *B60N 2/5628* (2013.01); *B60N 3/104* (2013.01); *B60R 7/04* (2013.01)

(58) Field of Classification Search

CPC ...... B60N 2/3052; B60N 2/5628; B60N 2/80; B60N 3/104; B60R 7/043

See application file for complete search history.

(56) References Cited

U.S. PATENT DOCUMENTS

| | | | | |
|---|---|---|---|---|
| 7,523,985 | B2 * | 4/2009 | Bhatia | B60N 2/5628 297/188.1 |
| 9,950,674 | B1 * | 4/2018 | Kalergis | B60R 7/043 |
| 10,328,831 | B2 * | 6/2019 | Takada | H04R 1/025 |
| 11,351,898 | B2 * | 6/2022 | Line | B60N 2/80 |
| 11,577,656 | B2 * | 2/2023 | Harmon | B60R 7/10 |
| 11,738,690 | B2 * | 8/2023 | Pawlowski | B60R 7/043 224/542 |
| 12,162,604 | B2 * | 12/2024 | Hansen | H04B 1/3888 |
| 12,179,706 | B2 * | 12/2024 | Meyer | B60N 2/22 |
| 12,227,119 | B2 * | 2/2025 | Cha | B60R 5/00 |
| 2018/0265010 | A1 * | 9/2018 | Line | B60N 2/22 |
| 2022/0144168 | A1 * | 5/2022 | Ito | G08B 21/24 |
| 2023/0294480 | A1 * | 9/2023 | Jierian | B60H 1/246 |
| 2023/0391237 | A1 * | 12/2023 | Feltham | B60N 2/5628 |

(Continued)

FOREIGN PATENT DOCUMENTS

| | | | | |
|---|---|---|---|---|
| CN | 109383338 A | * 2/2019 | | B60N 2/853 |
| CN | 112297973 A | * 2/2021 | | B60N 2/506 |
| CN | 118833160 A | * 10/2024 | | B60R 16/08 |

(Continued)

*Primary Examiner* — Timothy J Brindley
(74) *Attorney, Agent, or Firm* — Jeremy J. Klobucar

(57) ABSTRACT

A vehicle seat configured to be disposed within a vehicle includes a seat bottom, a seat back, and a storage compartment system. The storage compartment system includes a storage compartment disposed within the seat bottom and configured to receive an electronic device, and a wireless charger configured to charge the electronic device. A cooling module is configured to provide cooling to the storage compartment to cool the electronic device.

12 Claims, 3 Drawing Sheets

(56) References Cited

U.S. PATENT DOCUMENTS

2024/0227652 A1 * 7/2024 Kwon .................... B60N 3/103

FOREIGN PATENT DOCUMENTS

DE 102014013955 A1 * 3/2016 ............. B60N 2/206
DE 102023118969 A1 * 1/2025 ........... B62D 65/024
FR 2977202 A1 * 1/2013 ............. B60N 2/933
KR 20100132844 A * 12/2010 ........... B60N 2/5657
KR 20200081021 A * 7/2020 ............. B60R 7/043

* cited by examiner

VEHICLE SEAT WITH ELECTRONIC DEVICE CHARGER

CROSS REFERENCE TO RELATED APPLICATION

This application claims the benefit of U.S. Provisional Pat. App. No. 63/478,374, filed Jan. 4, 2023, the contents of which are incorporated herein by reference thereto.

FIELD

The present application relates generally to vehicle systems and, more particularly, to vehicle seats with integrated electronic device charging systems.

BACKGROUND

With increased use of electronic devices, vehicle drivers and passengers often desire a way to charge and store those electronic devices while in transit. Users often rely on aftermarket devices, like cradles, to hold and recharge their devices. Some vehicles include dedicated charging pads typically located near a center cluster. However, in-vehicle storage and charging space is often limited to a single device, leaving many passengers without storage and charging options. Thus, while such conventional systems do work for their intended purpose, it is desirable to provide continuous improvement in the relevant art.

SUMMARY

In accordance with one example aspect of the invention, a vehicle seat configured to be disposed within a vehicle is provided. In one example implementation, the vehicle seat includes a seat bottom, a seat back, and a storage compartment system. The storage compartment system includes a storage compartment disposed within the seat bottom and configured to receive an electronic device, and a wireless charger configured to charge the electronic device.

In addition to the foregoing, the described vehicle seat may include one or more of the following features: a cooling module configured to provide cooling to the storage compartment to cool the electronic device; wherein the cooling module is a seat ventilation unit further configured to provide cooling to the vehicle seat to cool a passenger seated therein; wherein the seat ventilation unit comprises one or more fans to generate a cooling airflow to the storage compartment and the vehicle seat; and wherein the seat ventilation unit includes a first duct configured to supply a first cooling airflow to the vehicle seat, and a second duct fluidly coupled to the storage compartment and configured to supply a second cooling airflow to the storage compartment.

In addition to the foregoing, the described vehicle seat may include one or more of the following features: wherein the wireless charger is an inductive charger; wherein the storage compartment includes a door configured to move between an open position that enables the electronic device to be inserted into or removed from the storage compartment, and a closed position that encloses the storage compartment; wherein the storage compartment is disposed within and is accessible from an inboard side of the seat bottom; wherein the storage compartment includes a base, wherein the wireless charger is integrated into the base, a top wall, opposed side walls, a rear wall, and a door; and a headrest with one or more speakers to define a headrest sound zone, wherein the headrest sound zone is configured to wirelessly connect to the electronic device to play audio on the one or more speakers via the electronic device.

In accordance with another example aspect of the invention, a vehicle seat system for a vehicle is provided. In one example implementation, the vehicle seat system includes a track system integrated with a floor of the vehicle, a plurality of vehicle seats each slidably coupled to the track system and rotatable thereon, each vehicle seat including a seat bottom, a seat back, and a storage compartment system. The storage compartment system includes a storage compartment disposed within the seat bottom and configured to receive an electronic device, and a wireless charger configured to charge the electronic device.

In addition to the foregoing, the described vehicle seat system may include one or more of the following features: a cooling module configured to provide cooling to the storage compartment to cool the electronic device; wherein the cooling module is a seat ventilation unit further configured to provide cooling to the vehicle seat to cool a passenger seated therein; wherein the seat ventilation unit comprises one or more fans to generate a cooling airflow to the storage compartment and the vehicle seat; and wherein the seat ventilation unit includes a first duct configured to supply a first cooling airflow to the vehicle seat, and a second duct fluidly coupled to the storage compartment and configured to supply a second cooling airflow to the storage compartment.

In addition to the foregoing, the described vehicle seat system may include one or more of the following features: wherein the wireless charger is an inductive charger; wherein the storage compartment includes a door configured to move between an open position that enables the electronic device to be inserted into or removed from the storage compartment, and a closed position that encloses the storage compartment; wherein the storage compartment is disposed within and is accessible from an inboard side of the seat bottom; wherein the storage compartment includes a base, wherein the wireless charger is integrated into the base, a top wall, opposed side walls, a rear wall, and a door; and a headrest with one or more speakers to define a headrest sound zone, wherein the headrest sound zone is configured to wirelessly connect to the electronic device to play audio on the one or more speakers via the electronic device.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously mentioned, current vehicles typically have limited options for storing and charging of electronic devices. Accordingly, the systems described herein provide one or more vehicle seats each with a dedicated storage and charging compartment on the side of the lower cushion for storing and charging portable electronic devices. Additionally, when stored, a user profile can link to that specific vehicle seat with a user's personal settings for seat position, climate, comfort, audio, etc. The system is also configured to integrate with a vehicle controller and vehicle screen to display user-specific functions when a device is recognized. The system is also configured to integrate with headrest sound zones in the vehicle seat, thereby allowing users to individually select audio that is controlled by the phone connected to each individual vehicle seat.

In one example, each storage and charging compartment is located on the inboard side of the seat, closing the gap between the center console and the seat. However, the powered storage compartment may be positioned in other locations in the seat. Further, alternate settings/configurations to the seats, which are in an adjustable track system, can be automatically set based on predetermined settings set by the user and activated upon ingress and/or egress from the vehicle. Thus, a user electronic device is configured to integrate with the vehicle's seats and user experience system to control their personal audio and interior experience regardless of the position of vehicle displays or seats. In one example, the vehicle seats are fully adjustable fore-aft on the track system and can be rotated (e.g., 180°, 360°) in the seat tracks while still providing a wireless charger solution.

Advantageously, the storage compartment system allows a user to store their electronic device, charge, and sync personal settings with their specific seat for a more personalized experience. The system also includes a cooling module (e.g., thermoelectric unit or rerouted airflow from seat venting system) configured to cool the charging electronic device. As such, the storage compartment system provides storage, charging, cooling integrated into each vehicle seat allowing a user to charge their phone regardless of proximity to a conventional center console wireless charger. The system also automatically recognizes users by their specific device and preferences and adjusts each seat accordingly. As noted, existing seat ventilation may be utilized to cool the wireless charger/electronic device by routing a duct in the cushion.

Figure 1:
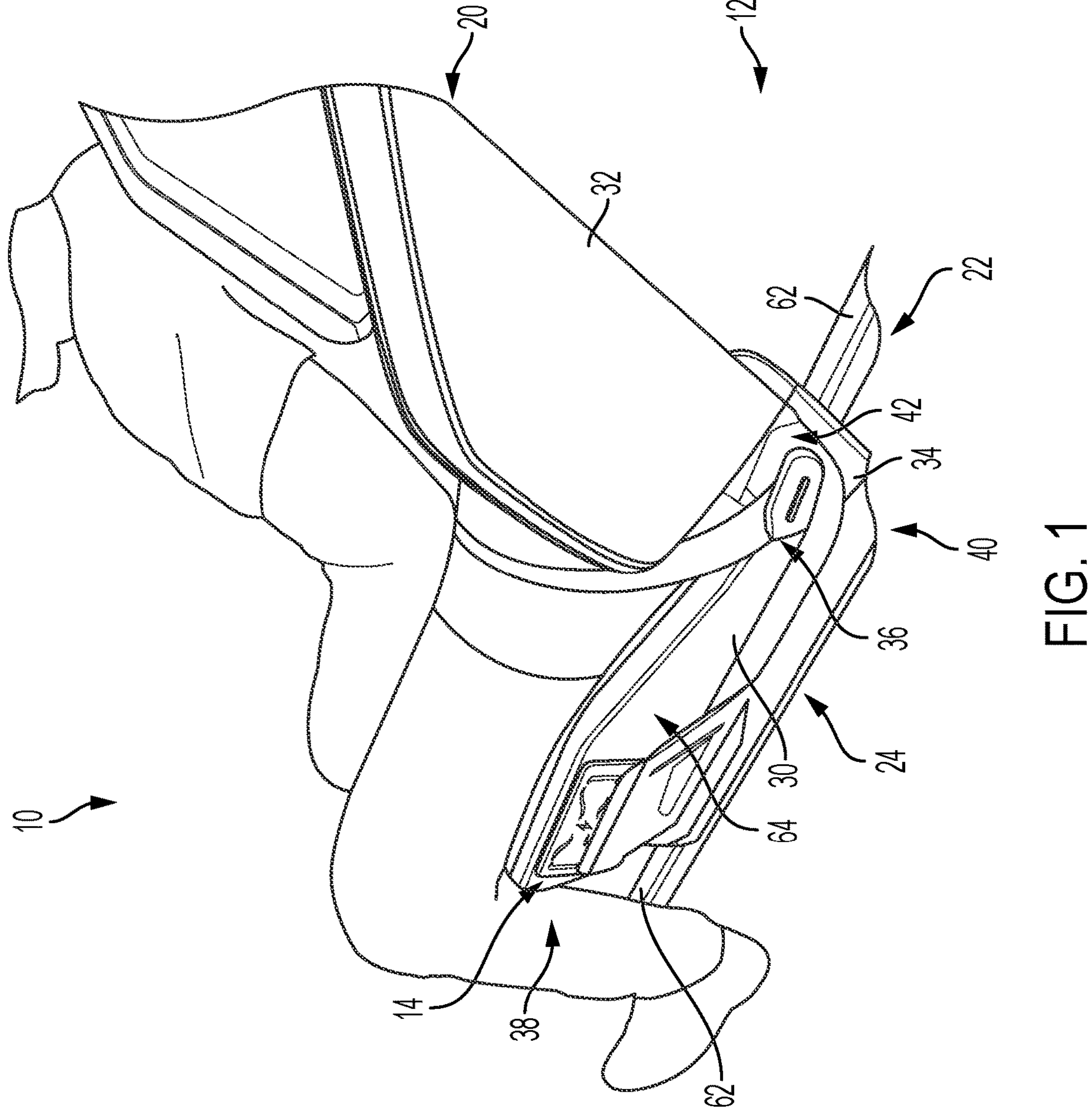
FIG. 1 is a perspective view of an example vehicle seat system with a cooled and powered storage compartment system in accordance with the principles of the present application.

With reference now to FIG. 1, a vehicle 10 with an example vehicle seat system 12 having a cooled and powered storage compartment system 14 is illustrated in accordance with the principles of the present invention. The storage compartment system 14 is intended to receive an electronic device, such as a smart phone, and is a storage compartment for each seat that provides a dedicated storage area to store, charge, and cool the electronic device.

In the example embodiment, the vehicle seat system 12 generally includes a plurality of vehicle seats 20 (only one shown) movably coupled to a track or rail system 22 that is integrated with a floor 24 of the vehicle 10. As illustrated, each vehicle seat 20 generally includes a seat bottom 30, a seat back 32, a seat mounting structure 34, and an occupant restraint system 36. Seat bottom 30 includes a distal or forward end 38 and a proximal or rearward end 40, which is rotatably coupled to seat back 32 at a pivot joint 42. In some implementations, seat bottom 30 is configured to rotate about a pivot point between a seating position (shown) and a stowed position (not shown) where seat bottom 30 is rotated upward toward seat back 32 for storage.

Figure 3:
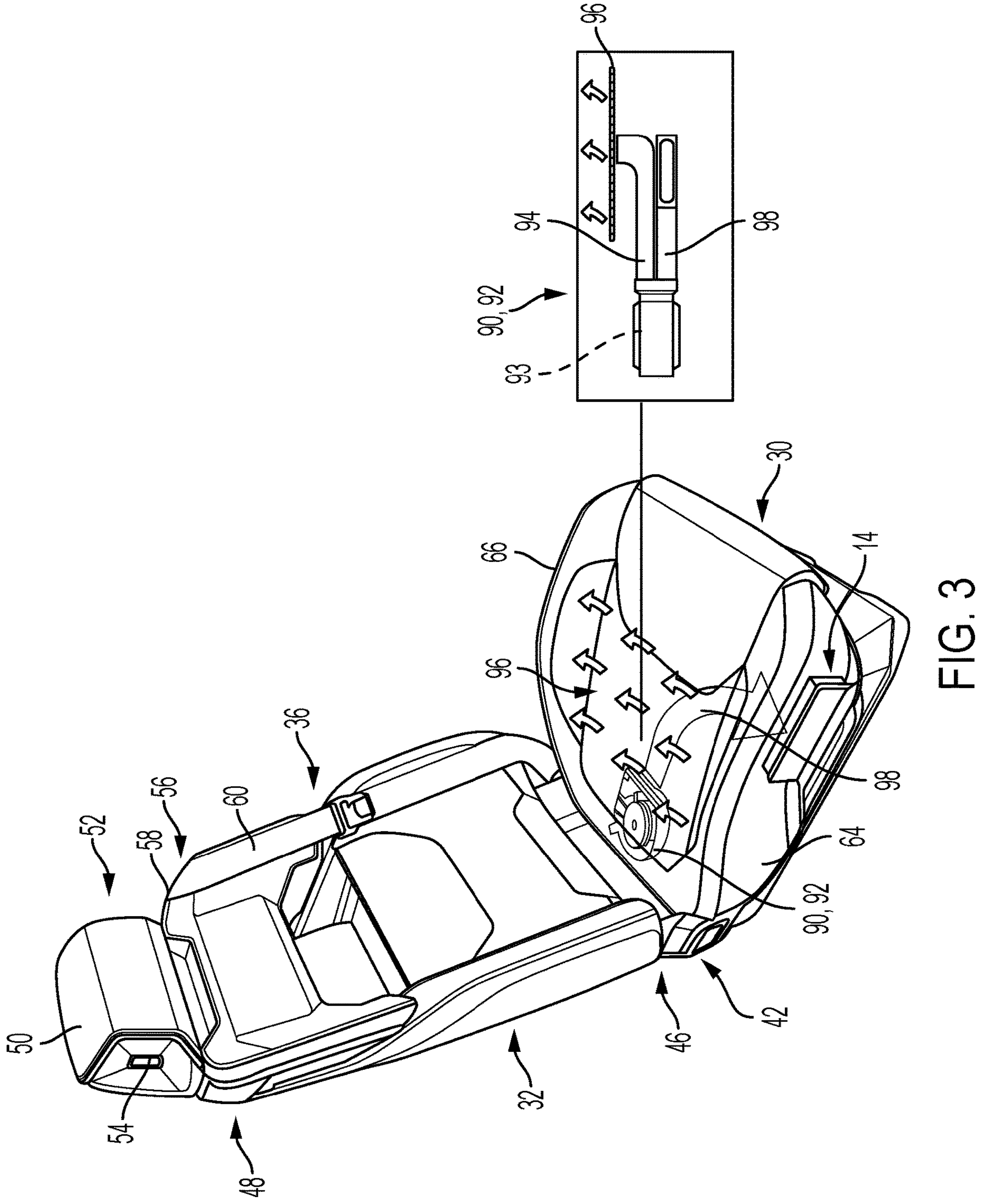
FIG. 3 is a perspective view of the vehicle seat system with an example cooling module for the cooled and powered storage compartment system, in accordance with the principles of the present application.

With additional reference to FIGS. 1 and 3, seat back 32 generally includes a lower end 46, an upper end 48, and a head rest 50 having a headrest sound zone 52 created by one or more speakers 54. Seat back lower end 46 is positioned proximate seat bottom 30 and includes pivot joint 42. Seat back upper end 48 includes a seat belt shoulder guide 56 formed therein that includes a slot 58 (FIG. 3) configured to receive a seat belt 60 of the occupant restraint system 36. Seat belt shoulder guide 56 is configured to position a portion of the seat belt such that seat belt 60 generally extends over an occupant's shoulder and across a chest toward the opposite side hip. Headrest 50 is coupled to seat back upper end 48.

In the example embodiment, the seat mounting structure 34 is removably and slidably coupled to rail system 22. In this way, each vehicle seat 20 may be removably coupled to the rail system 22 such that a desired number of seats 20 may be removed from or installed into the vehicle 10. This gives the user the ability to vary the seating arrangements within vehicle 10 to provide a desired amount of cargo space or to accommodate a desired number of passengers. The rail system 22 includes one or more rails 62 that extend from a front to the rear of the vehicle 10. Each rail 62 is configured to removably receive one or more vehicle seats 20 as well as a storage console (not shown) such as, for example, a center console that is disposed between driver and front passenger seats. In the example implementation, the vehicle seats 20 are configured to selectively slide along the rail(s) 62 and lock into a desired position thereon.

Figure 2:
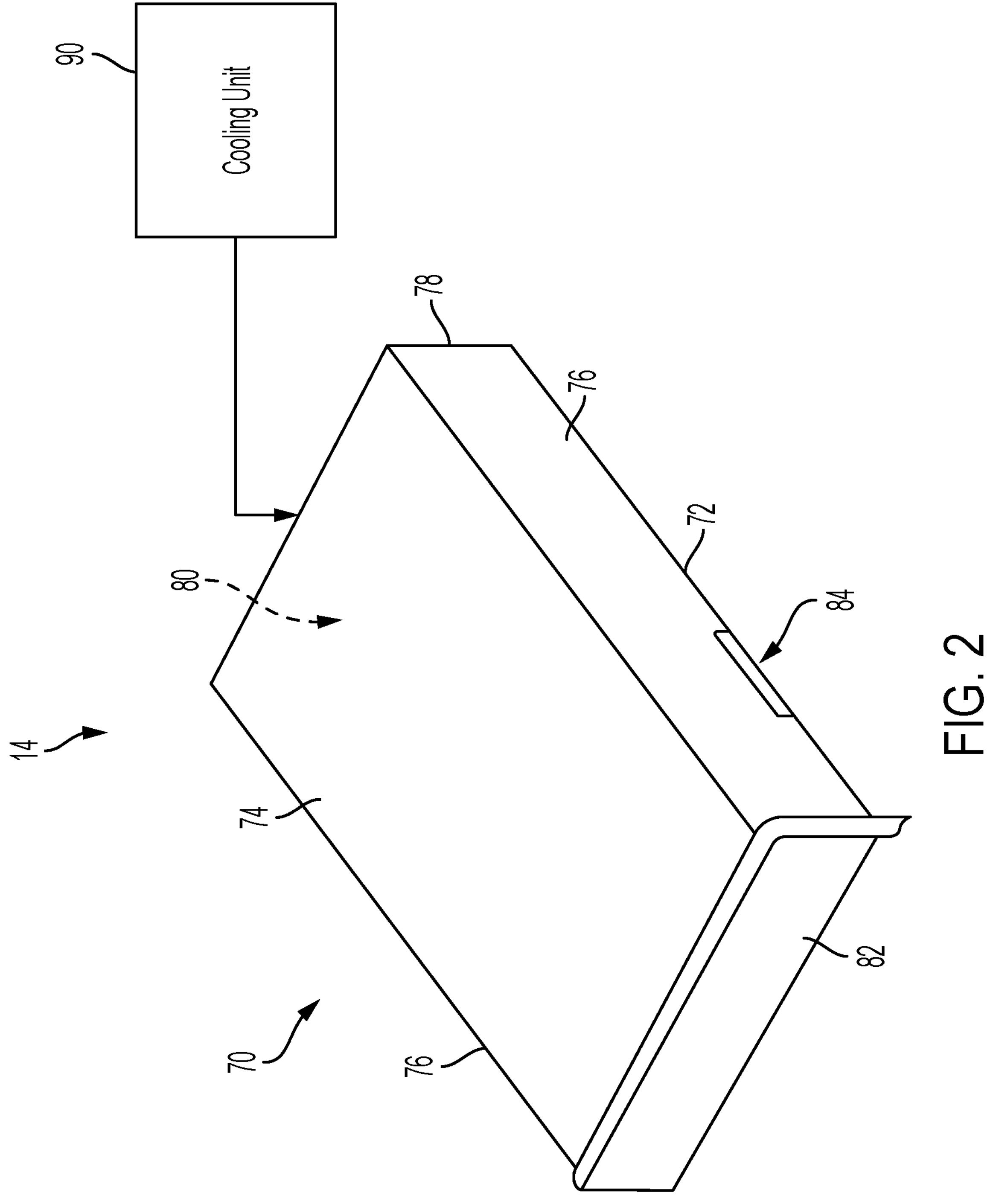
FIG. 2 is a perspective view of the example cooled and powered storage compartment system, in accordance with the principles of the present application.

With reference now to FIG. 2, the cooled and powered storage compartment system 14 will be described in more detail. In the example embodiment, storage compartment system 10 generally includes a storage compartment 70 formed or integrated into the vehicle seat 20. In the example implementation, the storage compartment 70 is located on an inboard side 64 of the vehicle seat (e.g., facing a center line of the vehicle). However, it will be appreciated that storage compartment 70 may be located in any suitable area such as, for example, an outboard side 66 or seat forward end 38.

In the example embodiment, the storage compartment 70 has a generally rectangular structure that includes a base 72, a top wall 74, opposed sidewalls 76, and a rear wall 78 at least partially defining a storage space or area 80. However, it will be appreciated that storage compartment 70 may have any suitable structure or shape, for example, for packaging and design considerations. In the example embodiment, the storage compartment 70 further includes a door 82 that opens to receive an electronic device such as, for example, a smart phone. The door 82 may be rotatably coupled to storage compartment (e.g., at base 72) and is configured to move between an open position that allows an electronic device to be placed in the storage area 80, and a closed position that encloses the storage area 80. In other configurations, the door 82 is attached to a platform (not shown) and is configured to be grasped and slid away from the vehicle seat 20 such that the platform slides out from the vehicle seat 20 to allow the electronic device to be placed thereon. It will be appreciated that other configurations are envisioned that enable an electronic device to be placed within or removed from the storage area 80.

In the example implementation, the storage compartment 70 includes a wireless charger 84 (e.g., induction charger), which may be a separate component or integrated into the storage compartment 70, for example, in base 72. Although not shown, the wireless charger 84 is electrically coupled to a power source in the vehicle 10. In this way, the wireless charger 84 is configured to automatically wirelessly charge an electronic device when disposed within the storage compartment 70.

With reference now to FIGS. 2-3, in the example embodiment, the cooled and powered storage compartment system 14 further includes a cooling module 90 configured to cool the storage compartment 70. As is well known, electronic devices often generate heat during recharging, including during wireless inductive charging, which may undesirably affect the performance of the device. In this way, the cooling module 90 provides cooling to the storage compartment 70 to facilitate cooling of an electronic device stored therein.

In the illustrated example, the cooling module 90 is a seat ventilation unit 92 disposed within the seat bottom 30 and/or seat back 32, or other suitable location within the vehicle 10. The seat ventilation unit 92 includes one or more fans 93 configured supply a flow of cooling air through a first duct 94 and subsequently through a plurality of perforations 96 formed in the seat bottom 30 and/or seat back 32, for cooling of a passenger seated in vehicle seat 20. Further, in the example system, a second duct 98 is fluidly coupled to the storage compartment 70 such that the fan(s) 93 are configured to supply a second flow of cooling air into the storage compartment 70 for cooling of an electronic device disposed therein. Although not shown, the first duct 94 and/or the second duct 98 may include a valve configured to selectively block or reduce airflow when passenger cooling or electronic device cooling is not desired. Alternatively, or additionally, the cooling module 90 may include a thermoelectric device integrated into the storage compartment 70 to provide cooling to an electronic device stored therein. It will be appreciated, however, that cooling module may be any suitable cooling device that enables storage compartment system 14 to function as described herein.

Described herein are systems and methods for storing, charging, and cooling of a portable electronic device within a vehicle. The vehicle includes one or more passenger seats with a storage compartment integrated into the seat. A user can access the storage compartment, for example via a small door on a side of the seat, to insert or remove the electronic device. The storage compartment includes a wireless inductive charging unit to automatically charge an electronic device when stored therein. Additionally, the storage compartment includes or is coupled to a cooling module to provide cooling to the electronic device when disposed inside the compartment.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle seat configured to be disposed within a vehicle, the vehicle seat comprising:

a seat bottom;

a seat back;

a seat ventilation unit disposed within the seat bottom and/or the seat back; and a storage compartment system, comprising:

a storage compartment disposed within the seat bottom and configured to receive an electronic device, wherein the storage compartment is disposed within and is accessible from an inboard side of the seat bottom; and a wireless charger configured to charge the electronic device, wherein the seat ventilation unit includes one or more fans to generate a cooling airflow to (i) the storage compartment to cool the electronic device, and (ii) the vehicle seat to cool a passenger seated therein.

2. The vehicle seat of claim 1, wherein the seat ventilation unit comprises:

a first duct configured to supply a first cooling airflow to the vehicle seat; and a second duct fluidly coupled to the storage compartment and configured to supply a second cooling airflow to the storage compartment.

3. The vehicle seat of claim 1, wherein the wireless charger is an inductive charger.

4. The vehicle seat of claim 1, wherein the storage compartment includes a door configured to move between an open position that enables the electronic device to be inserted into or removed from the storage compartment, and a closed position that encloses the storage compartment.

5. The vehicle seat of claim 1, wherein the storage compartment comprises:

a base, wherein the wireless charger is integrated into the base;

a top wall;

opposed side walls;

a rear wall; and a door.

6. The vehicle seat of claim 1, further comprising a headrest with one or more speakers to define a headrest sound zone, wherein the headrest sound zone is configured to wirelessly connect to the electronic device to play audio on the one or more speakers via the electronic device.

7. A vehicle seat system for a vehicle, comprising:

a track system integrated with a floor of the vehicle;

a plurality of vehicle seats each slidably coupled to the track system and rotatable thereon, each vehicle seat including a seat bottom, a seat back, a seat ventilation unit disposed within the seat bottom and/or the seat back, and a storage compartment system, comprising:

a storage compartment disposed within the seat bottom and configured to receive an electronic device, wherein the storage compartment is disposed within and is accessible from an inboard side of the seat bottom; and a wireless charger configured to charge the electronic device when disposed within the storage compartment, wherein the seat ventilation unit includes one or more fans to generate a cooling airflow to (i) the storage compartment to cool the electronic device, and (ii) the vehicle seat to cool a passenger seated therein.

8. The vehicle seat system of claim 7, wherein the seat ventilation unit comprises:

a first duct configured to supply a first cooling airflow to the vehicle seat; and a second duct fluidly coupled to the storage compartment and configured to supply a second cooling airflow to the storage compartment.

9. The vehicle seat system of claim 7, wherein the wireless charger is an inductive charger.

10. The vehicle seat system of claim 7, wherein the storage compartment includes a door configured to move between an open position that enables the electronic device to be inserted into or removed from the storage compartment, and a closed position that encloses the storage compartment.

11. The vehicle seat system of claim 7, wherein the storage compartment comprises:

a base, wherein the wireless charger is integrated into the base;

a top wall;

opposed side walls;

a rear wall; and a door.

12. The vehicle seat system of claim 7, further comprising a headrest with one or more speakers to define a headrest sound zone, wherein the headrest sound zone is configured to wirelessly connect to the electronic device to play audio on the one or more speakers via the electronic device.

* * * * *